June 24, 1958 F. BUDRECK 2,839,965
COLLAPSIBLE REAR VIEW MIRROR STRUCTURE FOR
USE WITH A TRACTOR-TRAILER COMBINATION
Filed Aug. 30, 1955 3 Sheets-Sheet 1
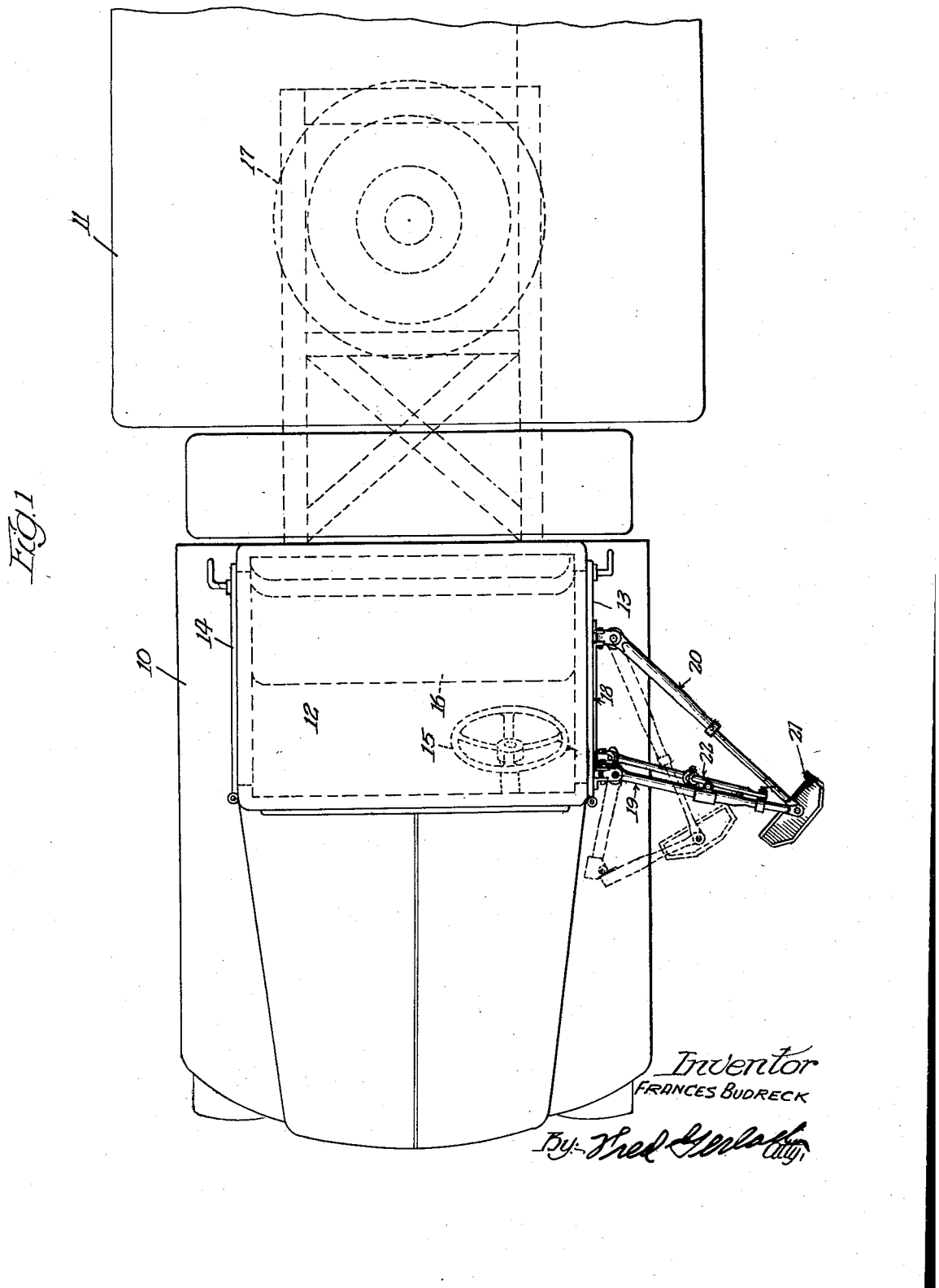

June 24, 1958 — F. BUDRECK — 2,839,965
COLLAPSIBLE REAR VIEW MIRROR STRUCTURE FOR
USE WITH A TRACTOR-TRAILER COMBINATION
Filed Aug. 30, 1955 — 3 Sheets-Sheet 2
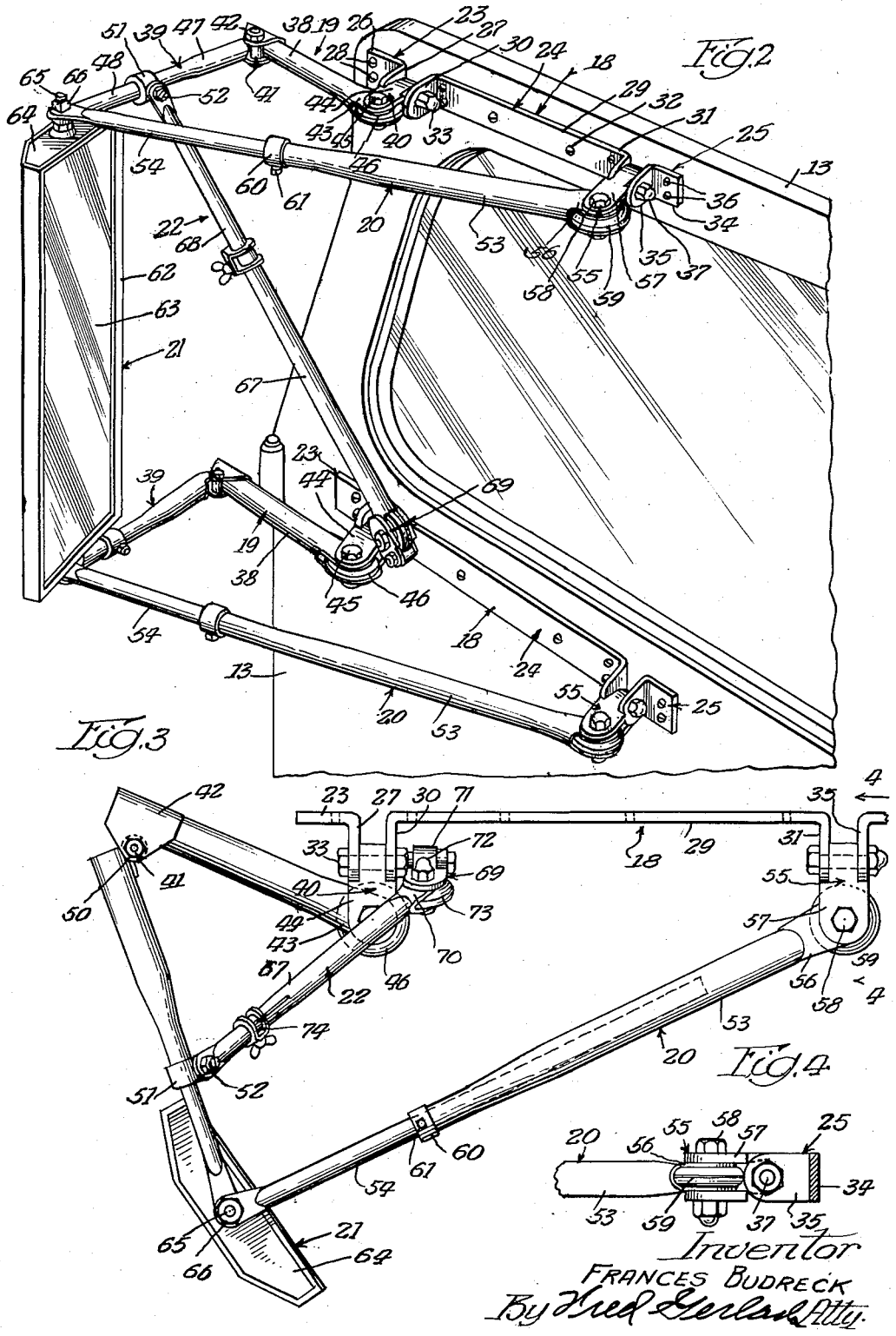
Inventor
FRANCES BUDRECK
By Fred Gerlach Atty.

June 24, 1958  F. BUDRECK  2,839,965
COLLAPSIBLE REAR VIEW MIRROR STRUCTURE FOR
USE WITH A TRACTOR-TRAILER COMBINATION
Filed Aug. 30, 1955  3 Sheets-Sheet 3
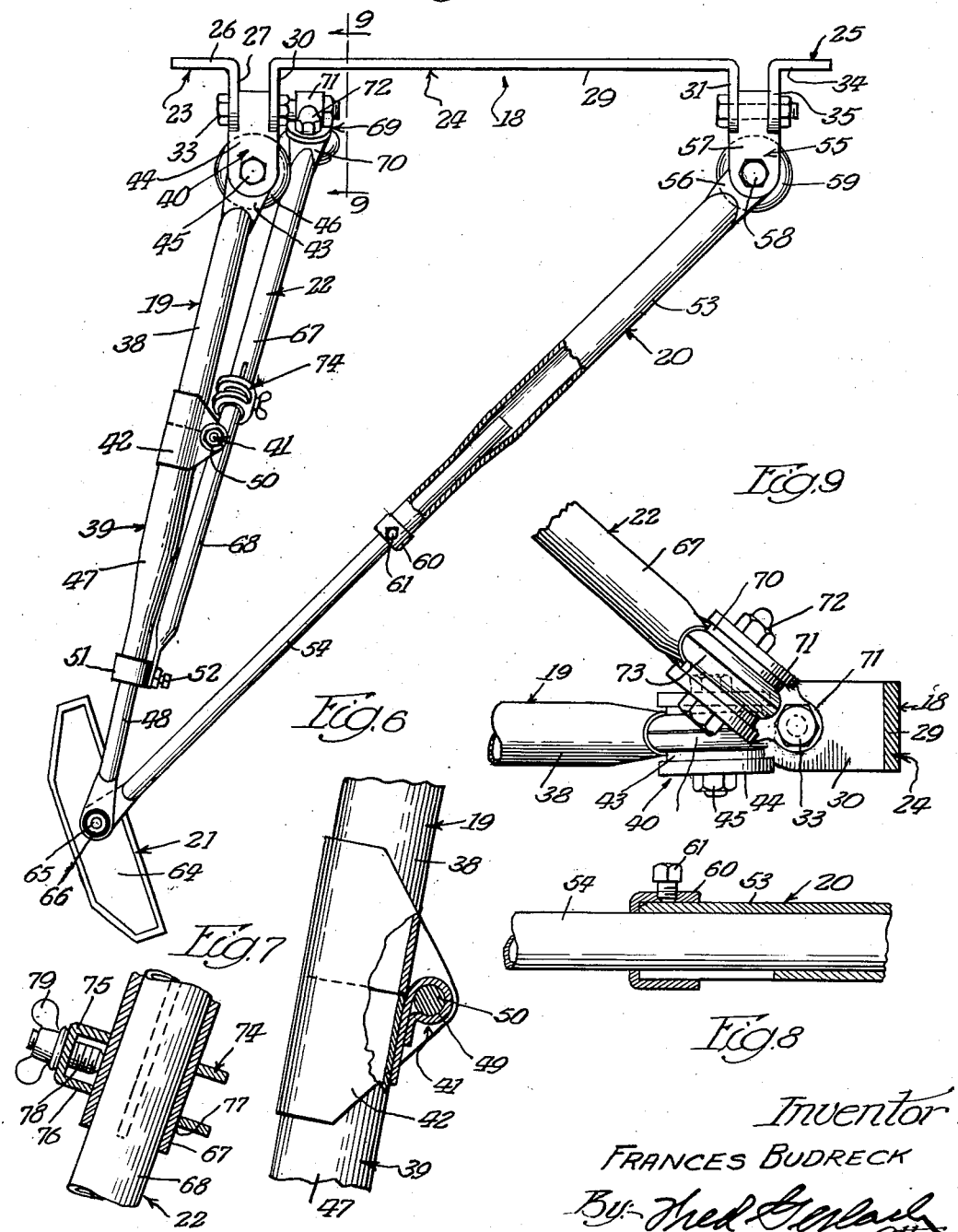
Inventor
FRANCES BUDRECK United States Patent Office 2,839,965
Patented June 24, 1958

2,839,965

COLLAPSIBLE REAR VIEW MIRROR STRUCTURE FOR USE WITH A TRACTOR-TRAILER COMBINATION

Frances Budreck, Chicago, Ill., assignor to Power Brake Parts Mfg. Co., Chicago, Ill., a corporation of Illinois Application August 30, 1955, Serial No. 531,328

1 Claim. (Cl. 88—98)

The present invention relates generally to rear view mirror structures. More particularly, the invention relates to that type of rear view mirror structure which is designed primarily for disposition on the outside of the tractor of a tractor-trailer combination, permits the driver of the combination while seated in the cab of the tractor to view objects behind or rearwards of the trailer, and as its parts or components comprises: (1) a pair of vertically spaced, horizontally extending front arms which are connected to, and extend outwards from, one side of the tractor cab; (2) a pair of vertically spaced, horizontally extending, rear arms which extend inwards and rearwards from the outer ends of the front arms and have the outer ends thereof connected to the outer ends of the front arms and their inner ends connected to said one side of the tractor cab at locations or points in spaced relation with the inner ends of the front arms; and (3) a vertically extending rectangular mirror which extends between the outer ends of the front and rear arms and has trunnions or other means at its upper and lower ends whereby it is mounted so that it may be angularly adjusted about a vertical axis in order that it may be properly viewed by the driver of the tractor-trailer combination to which the structure is applied.

In connection with a rear view mirror structure of the aforementioned type it has heretofore been proposed to construct the front and rear arms so that they are laterally rigid and hence for all intents and purposes hold the mirror at a fixed distance from the adjacent side of the cab of the tractor of the tractor-trailer combination to which the structure is applied. Ordinarily, in a tractor-trailer combination the trailer is much greater in width than the tractor and in connection with loading and unloading thereof it is disconnected from the tractor and the tractor is stored. In many instances it is desired that the tractor be stored in a comparatively small space. If the rear view mirror structure embodies front and rear arms which are laterally rigid to the end that the mirror is spaced a fixed distance from the adjacent side of the tractor cab the space in which the tractor may be stored after the trailer is disconnected from it cannot be of minimum width.

The principal object of this invention is to provide a rear view mirror structure which is an improvement upon, and has certain inherent advantages over, previously designed structures of the same general type and is characterized by the fact that it is so constructed and designed that, after disconnection of the trailer of the tractor-trailer combination to which the structure is applied, it may be manipulated into a collapsed position wherein the mirror thereof is disposed but a short distance from the adjacent side of the tractor cab to the end that the tractor may be stored in a space of minimum width.

Another object of the invention is to provide a rear view mirror structure in which the inner ends of the front and rear arms are pivotally mounted to swing about vertical axes and the front arms consist of inner and outer sections the adjoining ends of which are pivotally connected together in order that the front arms may selectively be shifted back and forth between a straight position wherein they maintain the structure in its normal or extended position and a folded position wherein they serve to maintain the structure in its collapsed position.

Another object of the invention is to provide a collapsible rear view mirror structure of the last mentioned character in which certain of the sections of the front arms are provided adjacent to the articulation points for the front arms with fixed U-shaped members which form parts of the pivotal connections between the inner and outer sections of the front arms and are so designed and constructed that when the sections are shifted from their folded position into their straight position they coact with the adjacent ends of the other sections to prevent the outer and inner sections from being swung past their straight position.

Another object of the invention is to provide a collapsible rear view mirror structure of the type and character under consideration in which the U-shaped members are so designed that they serve frictionally to hold the inner and outer sections of the front arms in their straight position.

Another object of the invention is the provision in a collapsible rear view mirror structure of the aforementioned character of an extensible strut which extends between the central portion of the outer section of the uppermost front arm and the inner end of the inner section of the lowermost front arm, has a universal joint at its lower end and a pivotal connection at its upper end, consists of a pair of telescopically connected members and releasable means for locking the members in the various positions into which they are slid, is adapted, as a preliminary to shifting the structure into its extended or collapsed position to have the locking means released so that its members are free to slide relatively to one another, and is further adapted after the structure has been shifted into either of its two positions to have the locking means applied to the end that the two telescopically connected members are held in a fixed position and hence rigidly or fixedly hold the structure into the particular position into which it is shifted or manipulated.

A further object of the invention is to provide a collapsible rear view mirror structure of the type and character under consideration in which the rear arms and the outer sections of the front arms are extensible and consist of telescopically connected members to the end that when the structure is in its normal or extended position the mirror may be adjusted to a limited extent towards or away from the adjacent side of the cab of the tractor of the tractor-trailer combination to which the structure is applied.

A still further object of the invention is to provide a collapsible rear view mirror structure which is generally of new and improved construction, effectively and efficiently fulfills its intended purpose, is capable of being manufactured at a comparatively low cost, and possesses long life.

Other objects of the invention and the various advantages and characteristics of the present collapsible rear view mirror structure will be apparent from a consideration of the following detailed description.

The invention consists in the several novel features which are hereinafter set forth and are more particularly defined by the claim at the conclusion hereof.

In the drawings which accompany and form a part of this specification or disclosure in which like numerals of reference denote the corresponding parts throughout the several views:

Figure 1 is a fragmentary plan view of a tractor-trailer combination having applied to the left door of the cab of the tractor thereof a collapsible rear view mirror structure embodying the invention, the structure being shown in full lines in its extended or normal position and shown in dotted lines in its collapsed position;

Figure 2 is a rear perspective view showing the structure in its collapsed position and illustrating in detail the arrangement and manner of mounting of the various component parts of the structure;

Figure 3 is a plan view showing the structure in its collapsed position;

Figure 4 is a vertical section taken on the line 4—4 of Figure 3 and illustrating the construction and design of the pivotal connections at the inner ends of the rear arms of the structure;

Figure 5 is a plan view showing the structure in its normal or extended position, certain parts being shown in section for purposes of illustration;

Figure 6 is a view, partly in plan and partly in section, showing the construction and design of one of the U-shaped members which are disposed between the adjoining ends of the inner and outer sections of the front arms, form parts of the pivotal connections between such sections, and serve when the front arms are shifted from their folded position into their straight position to prevent the front arms from being shifted past their straight position;

Figure 7 is a section of the releasable means for locking in place the telescopically connected members that constitute the extensible, diagonally extending struct for rigidly retaining the structure in either its extended or collapsed position;

Figure 8 is a section of one of the setscrew-equipped collars whereby the telescopically connected members constituting the rear arms are releasably held in the positions into which they are longitudinally adjusted; and Figure 9 is an enlarged vertical section taken on the line 9—9 of Figure 5 and illustrating in detail the construction and design of the universal joint at the lower end of the extensible, diagonally extending strut of the structure.

The rear view mirror structure that is shown in the drawings constitutes the preferred form or embodiment of the invention. It is adapted primarily for use in connection with a tractor-trailer combination and serves as a medium for permitting the driver of the combination to view objects in back of the trailer. The tractor-trailer combination is of conventional or standard design and comprises a tractor 10 and a trailer 11. The tractor embodies an internal combustion engine (not shown) for propelling purposes and has behind the engine a cab 12 for the driver of the combination. The cab embodies a left hand window-equipped side door 13 and a right hand window equipped side door 14 and has disposed therein a steering wheel 15 and a seat 16 for the driver. The trailer 11 is located behind the tractor 10 and is materially wider than the tractor. It is connected to the rear portion of the tractor by a detachable connection 17 in order that it may be disconnected from the tractor in connection with loading or unloading thereof and then may be again connected to the tractor as well understood in the art. The rear view mirror structure is shown in the drawings as being associated with the left hand window-equipped side door 13 of the cab 12 of the tractor. It is to be understood that the structure may be applied to the right hand window-equipped door 14 or that each of the side doors may be equipped with a rear view mirror structure. As its principal components or parts the structure comprises a pair of vertically spaced horizontally extending bracket arrangements 18, a pair of vertically spaced horizontally extending front arms 19, a pair of vertically spaced horizontally extending rear arms 20, a vertically extending rectangular mirror 21, and an extensible diagonally extending strut 22. Generally speaking, the structure is of unitary character and is so constructed or designed that it is capable of being shifted back and forth between an extended or operative position as shown in full lines in Figure 1 and a collapsed position as shown in dotted lines in Figure 1 and full lines in Figures 2 and 3.

As shown in Figure 2 the two bracket arrangements 18 are arranged or positioned so that the uppermost overlies the window in the left hand door 13 of the tractor cab 12 and the lowermost underlies the window. Each bracket arrangement 18 is composed of stamped metal parts and consists of a front angle bracket 23, an intermediate channel-variety bracket 24 and a rear angle bracket 25. The front angle brackets 23 are in the form of one-piece metallic stampings and consist of legs 26 and legs 27. The legs 26 fit flatly against the outer surface of the left hand door 13 and are secured in place by screws 28 or similar attaching devices. The legs 27 are formed integrally with the rear marginal portions of the legs 26 and extend outwards at right angles to said legs 26. The intermediate channel variety brackets 24 are located behind, but are spaced a small distance from, the front angle brackets 23 and consist of elongated intermediate pieces 29, front end pieces 30 and rear end pieces 31. The intermediate pieces 29 fit flatly against the outer surface of the door 13 and are fixedly secured in place by way of screws 32. The front end pieces 30 are connected to, and extend outwards at right angles from, the front ends of the intermediate pieces 29. They are spaced rearwards a small distance from the legs 27 of the angle brackets 23 and are connected to said legs 27 by way of horizontal bolts 33 the shanks of which extend through aligned holes in the end pieces 30 and the legs 27. The rear end pieces 31 of the channel variety brackets 24 are connected to, and extend outwards at right angles from, the rear ends of the intermediate pieces 29. The rear angle brackets 25 are located behind, but are spaced a small distance from, the intermediate channel variety brackets 24 and consist of legs 34 and legs 35. The legs 34 fit flatly against the outer surface of the door 13 and are fixedly secured in place by means of screws 36 or similar attaching devices. The legs 35 of the rear angle brackets 25 are connected to, and extend outwards at right angles from, the front margins of the legs 34. They are spaced a small distance from the rear end pieces 31 and are connected to the latter by way of horizontal bolts 37 the shanks of which extend through aligned or registering holes in the legs 35 of the rear angle brackets 25 and said rear end pieces 31 of the intermediate channel variety brackets 24.

The vertically spaced horizontally extending front arms 19 of the collapsible rear view mirror structure are supported by the bracket arrangements 18, consist of inner sections 38 of fixed length and extensible or longitudinally adjustable outer sections 39, and have pivotal connections 40 at the inner ends of the inner sections 38 thereof and pivotal connections 41 between the adjoining ends of their inner and outer sections. As hereinafter described more in detail, the pivotal connections 40 and 41 permit the front arms 19 to be shifted back and forth between a straight position wherein they coact with the rear arms 20 to hold the mirror structure as a whole in its normal or extended position and a forwardly folded or bent position wherein they coact with the rear arms to hold or maintain the structure in a collapsed position. The inner sections 38 of the front arms 19 are tubular, embody U-shaped members 42 on their outer ends, and have the inner ends thereof bifurcated in order to form pairs of horizontally extending spaced apart furcations 43. The pivotal connections 40 at the inner ends of the front arms 19 permit the inner sections 38 to swing forwards and rearwards about vertical axes and consist of horizontally extending U-shaped pivot brackets 44 and vertically extending pivot bolts 45. The central portions of the U- shaped pivot brackets 44 fit between the legs 27 of the front angle brackets 23 and the front end pieces 30 of the channel variety brackets 24 and extend around the central portions of the shanks of the bolts 33, and the end portions of the U-shaped pivot brackets 44 are arranged in straddled relation with the furcations 43 on the inner ends of the inner sections 38. The vertically extending bolts 45 of the pivotal connections 40 extend through aligned holes in the central portions of the furcations 43 and the end portions of the U-shaped pivot brackets 44 and also through pairs of washers 46. Such washers are cup-shaped, fit between the furcations 43 and serve to prevent bending of the furcations in connection with tightening of the nuts on the vertically extending pivot bolts 45. The U-shaped members 42 form parts of the pivotal connections 41 and have the inner end portions thereof extending around, and spot welded to, the outer ends of the tubular inner sections 38 of the front arms 19. As best shown in Figure 6 of the drawings the outer end portions of the U-shaped members 42 project beyond the outer ends of the inner sections 33 and the side portions of the members project rearwards an appreciable distance away from the outer ends of the inner sections 38 when the outer and inner sections 39 are in their straight position. The outer sections 39 of the front arms 19 consist of tubular inner members 47 and tubular outer members 48 which are in telescopically connected relation. The tubular outer members 48 of the outer sections 39 are of less diameter than the tubular inner members 47 and have the inner ends thereof fitting slidably in the outer ends of the inner members 47. The pivotal connections 41 between the adjoining ends of the inner and outer sections 38 and 39 consist of tubular pivot brackets 49 and vertically extending pivot pins 50 (see Figure 6). The pivot brackets 49 are disposed between the rearwardly projecting side portions of the U-shaped members 42 and are formed by bending metallic strips so that the central portions thereof are circular in cross section and the end portions are in abutting relation. The abutting end portions of the aforementioned metallic strips are spot welded together and are also welded to the inner ends of the tubular inner members 47 of the outer sections 39. The vertically extending pivot bolts 50 of the pivotal connections 41 are arranged so that the central portions thereof extend through the tubular pivot brackets 49 and their end portions extend through aligned or registering holes in the rearwardly projecting side portions of the U-shaped members. The pivotal connections 41 permit the inner and outer sections 38 and 39 of the front arms 19 to be shifted back and forth between a straight position as shown in Figure 5 and a forwardly bent or folded position as shown in Figures 2 and 3. The outer end portions of the U-shaped members 42 coact with the inner ends of the tubular inner members 47 of the outer sections 39 to prevent the inner and outer sections 38 and 39 from swinging rearwards past their straight position when they are shifted from their forwardly folded position into said straight position. The free side portions of the outer end portions of the U-shaped members are bent inwards so that when the inner and outer sections 38 and 39 are shifted into their straight position they grip the inner ends of the tubular inner members 47 frictionally and thus tend releasably but frictionally to hold the inner and outer sections 38 and 39 into their straight position. The outer ends of the tubular inner members 47 of the outer sections 39 are longitudinally split and have collars 51 mounted therearound. These collars are provided with radially extending setscrews 52 which when tightened cause the collars to contract the longitudinally split outer ends of the tubular inner members 48 into firm gripping relation with the slidably mounted inner ends of the tubular outer members 48. When it is desired to extend or shorten the outer sections 47 of the front arms 19, the setscrews 52 are loosened and then the tubular outer members 48 are slid outwards or inwards to the desired extent. Thereafter, the setscrews 52 are tightened so as to lock the tubular inner and outer members 47 and 48 against longitudinal displacement. The outer ends of the tubular outer members 48 of the outer sections 39 are flattened and have vertical holes therethrough.

The vertically spaced horizontally extending rear arms 20 of the rear view mirror structure extend between the outer ends of the front arms 19 and the rear ends of the bracket arrangements 18 and consist of tubular inner members 53 and tubular outer members 54. They are extensible and embody at the inner ends thereof pivotal connections 55. The inner members 53 have the inner ends thereof bifurcated in order to form spaced apart horizontally extending furcations 56. The pivotal connections 55 permit the rear arms 20 to swing forwards and rearwards about vertical axes and consist of horizontally extending U-shaped pivot brackets 57 and vertically extending pivot bolts 58. The central portions of the U-shaped pivot brackets 57 are disposed between the rear end piece 31 of the intermediate channel variety bracket 24 and the outwardly extending leg 37 of the rear angle bracket 25 and extend around the central portions of the shanks of the bolts 37. The end portions of the pivot brackets 57 are arranged in straddled relation with the furcations 56 on the inner ends of the inner members 53 of the rear arms 20. The vertically extending pivot bolts 58 extend through aligned holes in the end portions of the pivot brackets 57 and the central portions of the furcations 56. They also extend through pairs of cup-shaped washers 59 which are disposed between the furcations 56 and serve to prevent inward bending of the furcations in connection with tightening of the nuts on the pivot bolts 58. The outer ends of the tubular inner members 53 of the rear arms 20 are longitudinally split (see Figure 8) and are surrounded by clamping collars 60. The latter are provided with radially extending setscrews 61 which when tightened operate to contract the longitudinally split outer ends of the tubular inner members 53 into firm gripping relation with the inner ends of the tubular outer members 54. The outer members 54 of the rear arms 20 are of less diameter than the tubular inner members 53 and have the inner ends thereof mounted slidably within the outer ends of said inner members 53. When the setscrews 61 are loosened the tubular outer members 54 may be slid inwards or outwards with respect to the inner members 53 in order to adjust as desired the length of the rear arms 20. The outer ends of the tubular outer members 54 are flattened. They are arranged in lapped relation with the flattened outer ends of the tubular outer members 48 of the outer sections 39 of the front arms 19 and have vertically extending holes (not shown) in registry with the vertically extending holes in said flattened outer ends of the outer members 48. If desired the rear arms 20 may be made like the front arms 19 so that they too may be shifted back and forth between straight and folded positions.

The vertically extending rectangular mirror 21 of the rear view mirror structure extends between the outer ends of the front and rear arms 19 and 20 and consists of an open sided sheet metal shell 62 and a mirror plate 63 within the open side of the shell. The shell 62 embodies at its ends horizontally extending end walls 64 the central portions of which are provided with fixed vertically extending bolts 65. The latter extend through the aforementioned holes in the flattened outer ends of the outer members 48 of the outer sections 39 and the outer members 54 of the rear arms 20, embody clamp nuts 66 at their outer ends, and serve as trunnions whereby the mirror 21 is mounted so that it may be angularly adjusted about a vertical axis in order that the mirror plate 63 may be properly viewed by the driver of the tractor 10. After angular adjustment of the mirror, it is contemplated that the mirror will be locked in place by tightening of the clamp nuts 66 on the outer ends of the trunnion-forming bolts 65.

The extensible strut 22 of the rear view mirror structure extends diagonally between the outer end of the tubular inner member 47 of the outer section 39 of the uppermost arm 19 and the front end of the lower most bracket arrangement 18. It consists of a tubular lower member 67 and a tubular upper member 68 and has at its lower end a universal joint 69 in order that it is permitted to swing laterally in different directions in connection with back and forth shift of the structure between the latter's extended and collapsed positions. The lower member 67 of the strut 22 has the lower end thereof bifurcated in order to provide a pair of oppositely disposed spaced apart furcations 70. The universal joint 69 at the lower end of the strut 67 consists of a U-shaped pivot bracket 71 and a pivot bolt 72. The central portion of the pivot bracket 71 is substantially three-quarters round and extends loosely around the rear end portion of the shank of the bolt 33 of the lowermost bracket arrangement 18 in order that the pivot bracket may swing back and forth about the axis of said bolt. The end portions of the U-shaped pivot bracket 71 are arranged in straddled relation with the furcations 70 on the lower end of the lower member 67 of the extensible strut 22. The pivot bolt 72 of the universal joint 69 extends through registering holes in the end portions of the pivot bracket 71 and the central portions of the furcations 70 and also through a pair of cup-shaped washers 73. The latter are interposed between the furcations 70 and serve to prevent inward bending of said furcations in connection with tightening of the nut on the pivot bolt 72. The U-shaped pivot bracket 71 of the universal joint 69 permits the extensible strut 22 to swing back and forth about a horizontal axis and the pivot bolt 72 permits the strut to swing back and forth about an axis at right angles to the pivot axis of the pivot bracket 71. The upper end of the tubular lower member 67 of the extensible strut is longitudinally split and has mounted thereon a U-shaped clamping bracket 74. The latter is in the form of a sheet metal stamping and consists of an intermediate piece 75 and a pair of oppositely disposed spaced apart side pieces 76. The side pieces embody in the central portions thereof oversized circular holes 77 through which the longitudinally split upper end of the tubular lower member 67 extends. The U-shaped clamping bracket 74 is provided with a setscrew 78 which extends through a screw threaded hole in the intermediate piece 75 and embodies at its outer end an integral wing-equipped head 79. When the setscrew 78 is tightened it serves to contract the longitudinally split upper end of the tubular lower member 67 into firm gripping relation with the lower end of the tubular upper member 68. Said upper member 68 is of less diameter than the lower member 67 and is arranged so that its lower end fits slidably within the upper end of the lower member 68. The upper end of the tubular upper member 68 is flattened and embodies a hole (not shown) through which extends the setscrew 52 on the uppermost collar 51, i. e., the collar on the outer end of the tubular inner member 47 of the outer section 39 of the uppermost front arm 19. The aforementioned setscrew forms a pivotal connection between the upper end of the extensible strut 22 and the outer end of the tubular inner member 47 of the outer section of the uppermost front arm. It is contemplated that when the rear view mirror structure is shifted from one position to the other the setscrew 78 on the U-shaped clamping bracket 74 will be loosened so as to permit the upper member 68 of the extensible strut 22 to slide freely with respect to the tubular lower member 67. It is also contemplated that after the structure is shifted into its desired position the setscrew 78 will be tightened. As soon as the setscrew is tightened to its fullest extent the members of the strut are locked against relative sliding movement and hence the strut serves positively to hold the rear vision mirror structure in the position into which it is shifted. When the structure is shifted into its collapsed position the upper and lower members of the strut slide towards one another and when the structure is shifted into its extended or normal position the upper and lower members of the strut slide away from one another.

When the tractor 10 of the tractor-trailer combination is connected to the trailer 11, the rear view mirror structure will normally be in its extended position so as to permit the driver of the tractor to utilize the mirror 21 in connection with viewing of objects behind the trailer. Due to the fact that the mirror includes at its upper and lower ends the trunnion-forming bolts 65, it may be angularly adjusted into the proper position for best viewing of the mirror plate thereof by the tractor driver. When it is desired to collapse the rear view mirror structure in connection with storage of the tractor in a space of minimum width after disconnection of the tractor from the trailer it is only necessary to loosen the setscrew 78 on the U-shaped clamping bracket 74 and then shift the inner and outer sections 38 and 39 of the front arms 19 into their forwardly folded position. In connection with forward folding of said sections 38 and 39 the rear arms 20 swing forwards and inwards and the mirror 21 moves inwards as shown in dotted lines in Figure 1 and full lines in Figures 2 and 3. After forward folding of the outer and inner sections 38 and 39 of the front arms 19 the setscrew 78 is tightened so as to lock the tubular lower and upper members 67 and 68 of the strut 22 in place and thus cause the strut positively to hold the structure into its collapsed position. When it is desired to shift the structure into its extended or normal position the setscrew 78 is loosened and then the outer and inner sections 38 and 39 of the front arms 19 are shifted rearwards into their straight position. In connection with such shift of said inner and outer sections 38 and 39 the rear arms 20 swing rearwards and the mirror 22 moves outwards. After the structure is shifted into its extended position the setscrew 78 is tightened so as to lock the lower and upper members 67 and 68 of the strut 22 against relative sliding movement. When the rear view mirror structure is in its extended position, the mirror 21 may be adjusted inwards or outwards by loosening the setscrews 52 and 61 and then shifting the mirror either inwards so as to reduce the length of the front and rear arms 19 and 20 or outwards to increase the length of said arms.

The herein described rear view mirror structure effectively and efficiently fulfills its intended purpose and this is directly attributable to the fact that the front arms 19 are articulated and hence permit the structure as a whole to be shifted back and forth between extended and collapsed positions. By reason of the fact that the structure includes the extensible diagonally extending strut 67 it is possible positively to lock the structure in either of its two positions. Because the structure includes the bracket arrangements 18 it may be readily applied or mounted in place.

Whereas the rear view mirror structure has been described as being connected to one of the side doors of the cab of a tractor of a tractor-trailer combination, it is to be understood that the structure has other capabilities of use and may be used in connection with other types of vehicles. It is also to be understood that the pivotal connections for the front and rear arms may be so arranged that they permit the structure to be folded upwards or downwards instead of frontwards. In addition it is to be understood that the invention is not to be restricted to the details set forth since they may be modified within the scope of the appended claim without departing from the spirit and scope of the invention.

Having thus described the invention what I claim as new and desire to secure by Letters Patent is:

A collapsible rear view mirror structure adapted to be positioned exteriorly of one side of the driver's compartment of a vehicle and comprising, in combination, a pair of vertically spaced upper and lower composite front arms respectively adapted to extend outwardly from said side of the compartment, means at the inner ends of said composite front arms for attaching the same to said side of the compartment for swinging movements in both vertical and horizontal planes, a pair of vertically spaced upper and lower rear arms having their outer ends pivotally connected to the outer ends of the respective upper and lower composite arms, means at the inner ends of said rear arms for attaching the same to said side of the compartment at points spaced rearwardly from the attachment points for the composite front arms for swinging movements in both vertical and horizontal planes, said composite front arms consisting of inner and outer arm sections having adjacent ends pivotally connected together for relative swinging movement between the sections in the common planes of the upper front and rear arms and lower front and rear arms respectively, the outer arm sections of said composite front arms consisting of telescoping parts which are distal and proximate respectively in relation to the adjacent inner sections of said composite front arms, means for locking the telescoping parts of each outer arm section in selected positions of adjustment, a rigid extensible strut pivotally connected at one end to the upper composite front arm medially thereof, means pivotally connecting the other end of said strut to the inner end of said lower front composite arm, said strut consisting of telescoping parts, means for locking the telescoping parts of said strut in selected positions of adjustment, said upper and lower rear arms being extensible and consisting of telescoping parts, means for locking the telescoping parts of said rear arms in selected positions of adjustment, and a mirror assembly extending between and connected to the outer ends of said upper and lower arms respectively.

References Cited in the file of this patent

UNITED STATES PATENTS

| | | |
|---|---|---|
| 619,445 | Smith | Feb. 14, 1899 |
| 1,029,420 | Buzby | June 11, 1912 |
| 2,458,117 | Tolbert | Jan. 4, 1949 |
| 2,552,074 | Thompson | May 8, 1951 |
| 2,708,086 | Prutzman | May 10, 1955 |